United States Patent
Knauder

(10) Patent No.: US 6,554,325 B1
(45) Date of Patent: Apr. 29, 2003

(54) PIPE FITTING AND METHOD FOR THE PRODUCTION THEREOF

(75) Inventor: Josef Knauder, Villach (AT)

(73) Assignee: Hobas Engineering GmbH (AT)

( * ) Notice: Subject to any disclaimer, the term of this patent is extended or adjusted under 35 U.S.C. 154(b) by 0 days.

(21) Appl. No.: 09/762,360

(22) PCT Filed: Jun. 2, 2000

(86) PCT No.: PCT/EP00/05038

§ 371 (c)(1),
(2), (4) Date: Mar. 26, 2001

(87) PCT Pub. No.: WO00/75547

PCT Pub. Date: Dec. 14, 2000

(51) Int. Cl.[7] ................................................ F16L 17/00
(52) U.S. Cl. ...................................... 285/369; 285/417
(58) Field of Search ............................... 285/369, 370, 285/417, 382

(56) References Cited

U.S. PATENT DOCUMENTS

| | | | | |
|---|---|---|---|---|
| 2,896,976 A | * | 7/1959 | Wiltse | 285/369 X |
| 3,462,175 A | * | 8/1969 | Johnson | 285/423 X |
| 4,174,125 A | * | 11/1979 | Wyss | 285/369 X |
| 4,329,193 A | * | 5/1982 | Sznopek et al. | 285/423 X |
| 4,513,996 A | * | 4/1985 | Jost | 285/369 X |
| 5,330,238 A | | 7/1994 | Carlström | 285/291 |
| 5,758,906 A | * | 6/1998 | Carlstrom et al. | 285/369 X |

FOREIGN PATENT DOCUMENTS

| | | |
|---|---|---|
| DE | 22 17 488 A | 10/1973 |
| DE | 26 07 317 A | 8/1977 |
| DE | 27 44 739 A1 | 4/1978 |
| DE | 31 13 320 A1 | 2/1982 |
| EP | 0 691 506 A1 | 1/1996 |

* cited by examiner

Primary Examiner—Lynne H. Browne
Assistant Examiner—David E. Bochna
(74) Attorney, Agent, or Firm—Mark Kusner; Michael A. Jaffe

(57) ABSTRACT

The invention relates to a pipe fitting, in particular for connecting waste pipes, especially pipes consisting of glass fiber-reinforced plastic.

11 Claims, 1 Drawing Sheet

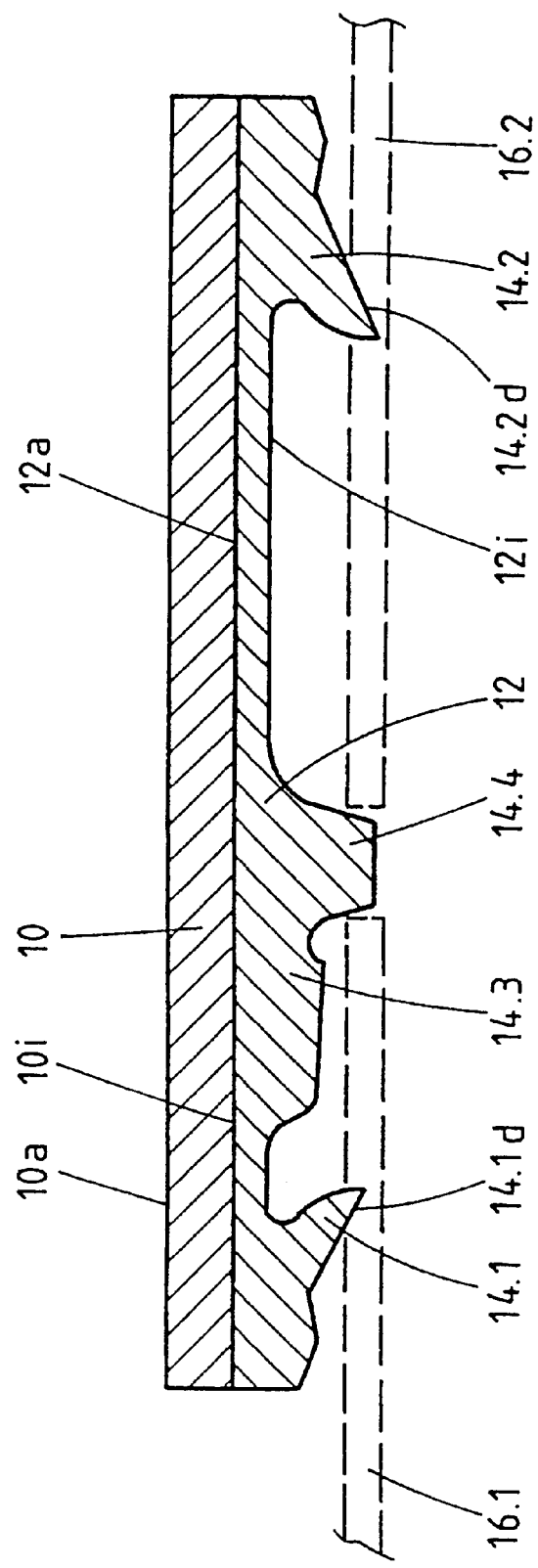

PIPE FITTING AND METHOD FOR THE PRODUCTION THEREOF

BACKGROUND OF THE INVENTION

The invention concerns a tube coupling, in particular for connecting drainage pipes, especially drainage pipes of glass-fiber-reinforced plastic.

A tube coupling of this kind is known from DE 27 44 739 A1. With respect to the basic construction of a tube coupling and its use, reference is made in the following to this publication.

The known tube coupling comprises a tube-like manchette of glass-fiber-reinforced plastic and a seal of a rubber-elastic material covering the manchette on the inside, while the seal has at least one sealing lip at each axial end projecting inwardly radially toward the manchette.

The manchette and the seal are mechanically anchored via corresponding projections and recesses in the area of the inside of the manchette or the outside of the seal.

The production of the known tube coupling is therefore complicated. Despite the variety of mechanical anchoring parts, the seal often becomes loose during the axial insertion of the respective tube ends.

BRIEF SUMMARY OF THE INVENTION

The object of the invention is the production of a tube coupling of this kind, which can be produced with a simple process and which provides a secure and permanent connection of the seal and the manchette.

The basic idea of the invention is to substitute the complicated boundary surface profile between the seal and the manchette with a planar (unprofiled) contact surface, in particular a cylindrical contact surface.

The problem is, however, that the two completely different materials of the manchette or the seal must be connected to each other. The manchette fundamentally consists of a solid hard material, while the seal is rubber elastic.

The manchette, for example, can be made of a glass-fiber-reinforced plastic, for example, a glass-fiber-reinforced polyester resin (with different additives and additions), while as material for the seal, for example, rubber or rubber-like materials such as ethylene/propylene dien terpolymer (EPDM) can be used.

No adhesives or bonding agents are known currently in the market, which make possible a secure and permanent connection of such different materials.

The invention is based on the recognition that a corresponding connection can be achieved via a chemical crosslinking of the respective surface sections of the seal and the manchette, wherefore the invention comprises in its most generalized embodiment a tube coupling with the following features:
  a tube-like manchette of glass-fiber-reinforced plastic,
  a seal of a rubber elastic material covering the manchette on the inside, wherein
    the seal has at least one sealing lip at each axial end, which projects inwardly radially toward the manchette, and
    the corresponding surface sections of the seal and the manchette are bonded together via chemical crosslinking by material-fit.

In this way, the seal can consist of the mentioned EPDM and the manchette of an unsaturated polyester resin (with corresponding additives and additions).

The manchette has preferably a cylindrical inner surface and the seal has a cylindrical outer surface, even though the mentioned chemical crosslinking can, of course, be obtained also with other surface geometries.

The chemical crosslinking can take place in different ways, for example, according to a thermal treatment, in particular of the surrounding surface of the seal, and an additional wrapping with an unsaturated polyester resin to form the manchette.

In its most general embodiment, the process for producing a tube coupling of the previously mentioned kind comprises the following steps:
  the seal is thermally heated on its outer surface up to the breaking up of carbon chains of the seal material;
  thereafter, a bonding agent or a mixture of the bonding agent and the material of the manchette is applied on the outer surface of the seal;
  then, the glass-fiber-reinforced plastic is applied, while forming the manchette, on the previously coated outer surface of the seal before finally
  a polymerization of the glass-fiber-reinforced plastic takes place under heat up to a complete hardening.

For the construction, it is possible to accommodate the seal, before heating its outer surface, on a mold, for example, an arbor.

The thermal heating of the outer surface of the seal can take place, for example, by means of UV or IR radiation, while the outer surface of the seal should reach a temperature of about 60° C.

The crosslinking of the sealing material with the material of the manchette can be promoted by intercalating a bonding agent or a mixture of the bonding agent and the material of the manchette.

In this way, the bonding agent can consist, for example, of polyurethane, which again closes the C chains of the sealing material, which had been previously broken up by thermal treatment.

To produce the tube coupling can be used a mold, which is longer than the breath of the seal, insofar the seal is to be framed at its end by the manchette.

In this way, a mold can be used, which has on its periphery a recess for accommodating the seal and which is aligned on its periphery with the outer surface of the seal at its ends which project beyond the seal at its end.

In this way, the manchette can be configured with a greater breath with respect to the seal.

However, a mold can also be used, wherein the recess is longer than the breath of the seal to accommodate, for example, in addition, supporting profiles on both sides of the seal, which will also later be covered by the manchette.

As material for the mold is suitable, for example, steel.

To be able to accommodate also the previously named sealing lips of the prefabricated seal nondestructively, before placing the seal on the mold, a correspondingly formed support ring can be put up as is known from DE 27 44 739 A1.

Other features of the invention result from the features of the dependent claims as well as the other application documents.

The invention will be described in more detail in the following in view of an embodiment.

BRIEF DESCRIPTION OF THE DRAWING

Therein, the single FIGURE shows a section through the jacket of a tube coupling according to the invention.

DETAILED DESCRIPTION OF THE INVENTION

With reference numeral 10 is designated a manchette of a glass-fiber-reinforced plastic (polyester resin), with reference numeral 12 is designated a corresponding seal made of EPDM.

The manchette 10 has a cylindrical inner surface 10*i* and a cylindrical outer surface 10*a*.

The seal 12 has a cylindrical outer surface 12*a* and a profiled inner surface 12*i*.

In the FIGURE can be seen that the seal 12 is configured at each of its ends with a sealing lip 14.1 or 14.2, and the sealing lips 14.1, 14.2 run transversely in inward direction toward each other.

Between the sealing lips 14.1, 14.2 is located a section 14.3 of the seal 12, which has a greater material thickness than the adjacent sealing sections toward the sealing lips 14.1, 14.2. From the thickened section 14.3 projects inwardly essentially radially a sealing plug 14.4, namely over the ends of the sealing lips 14.1, 14.2 in the shown unloaded condition.

The outer surface 12*a* of the seal 12 is chemically crosslinked by means of thermal heating, while intercalating a bonding agent, to the inner surface 10*i* of the manchette 10, so that a material-fit connection results between the seal 12 and the manchette 10, which produces an absolutely secure hold of the seal 12 on the manchette 10, namely also when, for example, respective end parts of tube lines are inserted into the shown tube coupling as illustrated in dash-lined manner in the FIGURE. When corresponding tube lines 16.1, 16.2 are inserted in the opposite direction, first the corresponding sealing lips 14.1 or 14.2 are pushed away inwardly arid outwardly so that they rest with their sealing surfaces 14.1*d*, 14.2*d* on the outer surface of the tube line 16.1 or 16.2.

The tube lines 16.1, 16.2 are pushed forward against each other as far until their frontal areas come to lie on both sides against the sealing plug 14.4.

What is claimed is:

1. Tube coupling with:
   a) a tube-like manchette (10) of glass-fiber-reinforced plastic,
   b) a seal (12) made of a rubber elastic material covering the manchette (10) on the inside wherein
   c) the seal (12) has at least one sealing lip (14.1, 14.2) at each axial end projecting radiaily inwardly to the manchette, characterized in that
   d) the corresponding surface sections (10*i*, 12*a*) of the seal (12) and the manchette (10) are connected to each other with material-fit by chemical crosslinking, wherein the seal (12) is thermally heated on its outer surface to a temperature that will break up the carbon chains of the sealing material.

2. Tube coupling according to claim 1, wherein the seal (12) is made of an ethylene/propylene dien terpolymer.

3. Tube coupling according to claim 1, wherein the manchette (10) is made of a material on a basis of at least one polyester resin.

4. Tube coupling according to claim 1, wherein the manchette (10) has a cylindrical inner surface (10*i*) and the seal (12) has a cylindrical outer surface (12*a*).

5. Tube coupling according to claim 1, wherein the sealing lips (14.1, 14.2) run transversally in inward direction toward each other.

6. Process for producing a tube coupling according to claim 1, with the following steps:
   a) after thermally heating the seal (12) on its outer surface to a temperature that will break up the carbon chains of the sealing material, applying a glass-fiber-reinforced plastic, while forming the manchette, on the previously coated outer surface of the seal; and
   b) thereafter, the polymerization of the glass-fiber-reinforced plastic takes place under heat up to the complete hardening.

7. Process according to claim 6, wherein the seal, before heating its outer surface, is put on a mold.

8. Process according to claim 6, wherein the thermal heating of the outer surface of the seal takes place by means of UV or IR radiation.

9. Process according to claim 6, wherein the outer surface of the seal is heated to about 60° C.

10. Process according to claim 6, wherein a bonding agent of polyurethane is applied.

11. Process according to claim 6, wherein after the seal is thermally heated on its outer surface, a bonding agent, or a mixture of the bonding agent and the material of the manchette, is applied to the outer surface of the seal.

* * * * *